United States Patent [19]

Bickel

[11] 3,977,004

[45] Aug. 24, 1976

[54] AIRCRAFT VLF/LF/MF WINDOW ANTENNA RECEIVING SYSTEM

[75] Inventor: John E. Bickel, San Diego, Calif.

[73] Assignee: The United States of America as represented by the Secretary of the Navy, Washington, D.C.

[22] Filed: June 16, 1975

[21] Appl. No.: 587,527

[52] U.S. Cl. .............................. 343/705; 343/853; 343/897

[51] Int. Cl.² .............................. H01G 1/28

[58] Field of Search .......... 343/120, 702, 868, 714, 343/713, 705

[56] References Cited

UNITED STATES PATENTS

| | | | |
|---|---|---|---|
| 2,307,805 | 1/1943 | Schnell | 343/702 |
| 2,314,234 | 3/1943 | Meier | 343/120 |

FOREIGN PATENTS OR APPLICATIONS

| | | | |
|---|---|---|---|
| 217,530 | 2/1942 | Germany | 343/705 |
| 524,653 | 8/1940 | United Kingdom | 343/120 |

*Primary Examiner*—Alfred E. Smith
*Assistant Examiner*—David K. Moore
*Attorney, Agent, or Firm*—R. S. Sciascia; G. J. Rubens; H. Fendelman

[57] ABSTRACT

Apparatus for receiving the horizontal and vertical electric field components of incoming VLF, LF, and MF (10 KHz to 3000 kHz) signals that is easily portable and installed within minutes aboard aircraft with windows. A sheet of metal or matrix of interconnecting wires is placed against the inside surface of non-conducting windows on each side of the aircraft fuselage and used as the receiving antennas. The voltage sum of the two window antennas is proportional to the vertical electric field. The voltage difference of the two window antennas is proportional to the horizontal electric field particularly when the antennas are forward or to the rear of the wings extending from the fuselage.

4 Claims, 4 Drawing Figures

FIG. 1
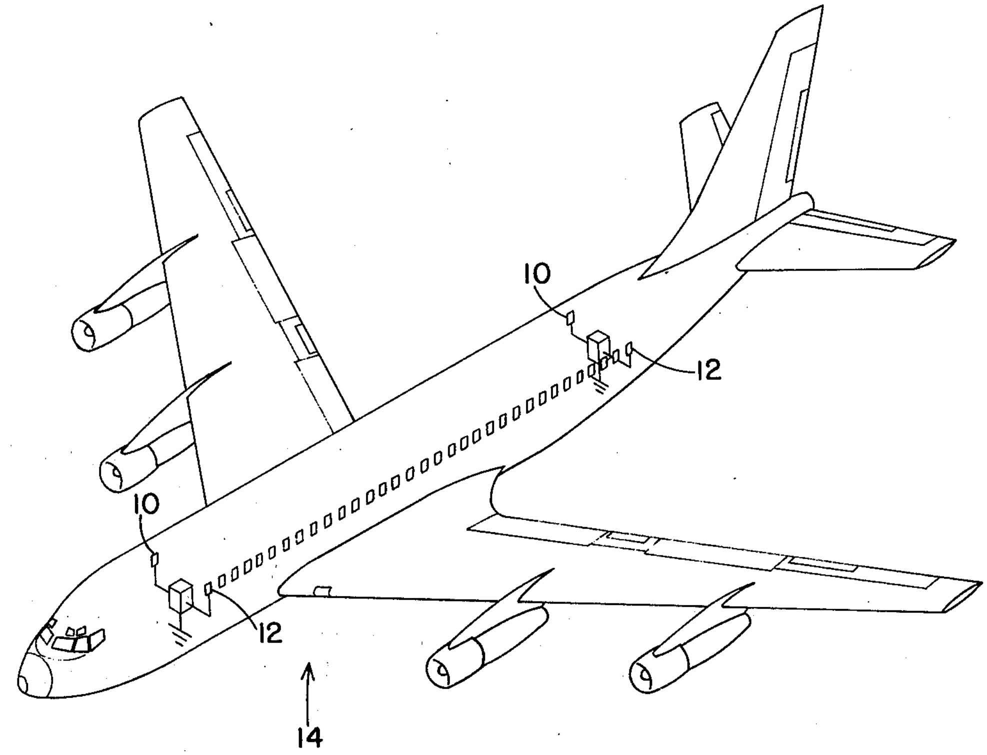
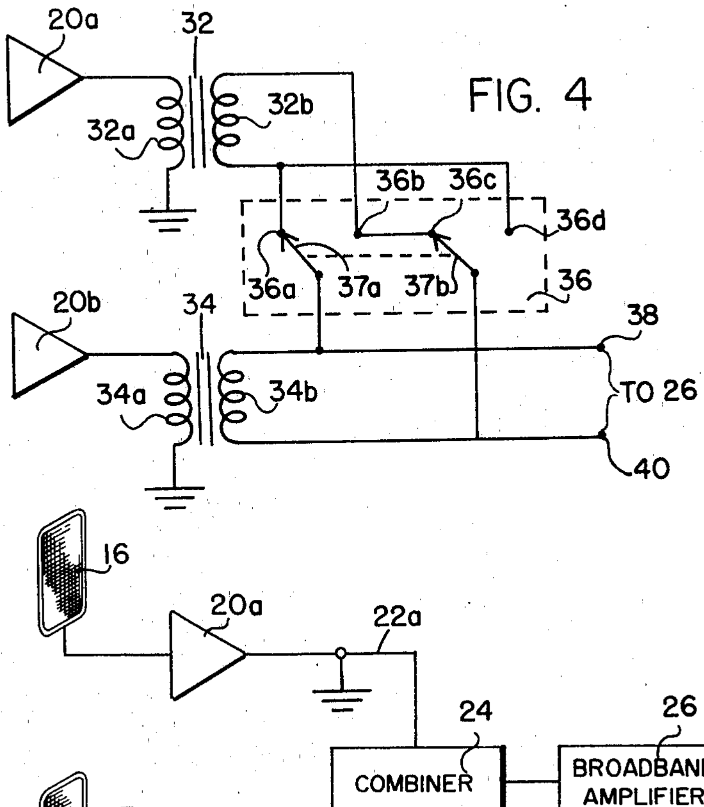
FIG. 4
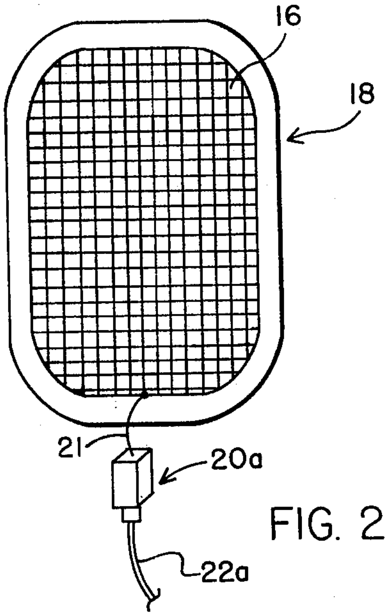
FIG. 2
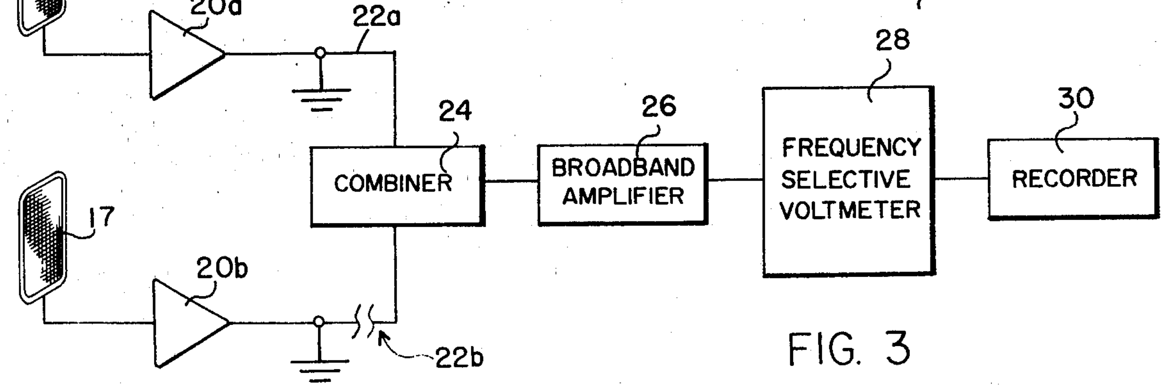
FIG. 3

AIRCRAFT VLF/LF/MF WINDOW ANTENNA RECEIVING SYSTEM

BACKGROUND OF THE INVENTION

U.S. Navy research into VLF/LF propagation phenomena has indicated significant advantage to recording electric field variation aboard in flight aircraft as it varies its distance or azimuth from the transmitter generating the signal. The horizontal electric field under certain propagation conditions will exceed the magnitude of the vertical component at aircraft altitudes even when excited by a vertical radiator. Furthermore, elevated and predominently horizontal radiators can excite higher horizontal fields than vertical radiators.

Data of the variation of signal with ranges or azimuth has been used to help determine the important properties of the propagation medium. Most data obtained in the past has been obtained aboard specially instrumented aircraft whose mission, at the time, was devoted to this purpose and which have had special receiving antennas installed aboard them. However, use of an aircraft with the permanent antenna installation for this purpose only is a relatively costly way of collecting data or receiving signals aboard an aircraft. In order to correctly evaluate and predict coverage from transmitters, it is desirable under certain circumstances, to collect large volumes of data or repeat a measurement on many different days to obtain day-to-day variation of the signal.

SUMMARY OF THE INVENTION

The present invention relates to a novel apparatus for enabling quick installation of antennas and associated instrumentation for monitoring VLF, LF and MF signals aboard any aircraft with non-conducting windows. The antenna is made of conducting material or wire matrix smaller than the window which is quickly installed by placing it against the inner surface of the window. It is then connected to the high impedance input of a small battery operated pre-amplifier immediately adjacent to the antenna to provide a low impedance output. One or two window antennas and associated pre-amplifiers on opposite sides of the aircraft fuselage may be used. If two antennas are used, the low impedance voltages may then be fed by cable to a combiner which will then provide switch selectable outputs equal to the left antenna, the right antenna, the voltage difference of the two antennas, or the voltage sum of the two antennas. The voltage difference is proportional to the horizontal electric field and the voltage sum is proportional to the vertical electric field while the aircraft is level. The combiner output is then amplified and fed to a receiver or frequency selective voltmeter for monitoring or recording signal variation on a strip chart or similar type recorder. The combiner, amplifier, receiver or frequency selective voltmeter, and recorder may be placed in a brief case for easy carrying and operation at the operator's feet. This portable and quickly installed system is well suited for use aboard commercial passenger flights of scheduled airlines or any other aircraft which has windows and may be operating for some purpose other than radio signal monitoring.

STATEMENT OF THE OBJECTS OF THE INVENTION

It is the primary object of the present invention to provide, for use on aircraft, antenna and combiner apparatus which can be installed quickly with no previous preparation of the aircraft and used to monitor or record the vertical electric and/or the horizontal electric field of VLF, LF, and MF signals.

Other objects, advantages and novel features of the invention will become apparent from the following detailed description of the invention when considered in conjunction with the accompanying drawings.

BRIEF DESCRIPTION OF THE DRAWINGS

FIG. 1 is a drawing of an aircraft with windows on the sides of the fuselage showing possible locations of the window antennas, cables and brief case containing the combiner, amplifier, monitoring and/or recording instrumentation.

FIG. 2 is an aircraft window showing the location of a wire mesh type of antenna and the association pre-amplifier.

FIG. 3 is a simplified electrical block diagram of the antenna elements, pre-amplifiers, novel combiner, and other possible monitoring circuitry according to the present invention.

FIG. 4 is a circuit diagram of the combiner of FIG. 3.

DESCRIPTION OF THE PREFERRED EMBODIMENT

The novel concept disclosed herein essentially comprises the use of quickly installed aircraft antennas placed against the inner surface of existing windows. It also includes use of a signal combiner that will add or subtract voltages from two antennas on opposite sides of the aircraft to obtain a voltage proportional to the vertical electric field from a vector sum of voltages and a voltage proportional to the horizontal electric field from the vector difference of the two voltages when the aircraft is level.

The antennas themselves may consist of an electrically conducting material which is centered against the inner surface of the window, does not touch any metal structure of the aircraft and may be held in place with an adhesive tape or wedge. It may be a metal screen material, made of aluminum, copper, or any other conductor; it may be opaque such as aluminum foil or any other type of opaque metal sheet; it may be a matrix of thin wires soldered together and embedded between or within plastic sheets so as not to block the view through the window in use; or it may be a transparent conducting surface deposited on a sheet of transparent plastic or glass which is then placed against the inner surface of the window.

FIG. 1 illustrates placement of two antennas 10 and 12 relative to each other. They are placed in windows directly opposite each other on the left and right side of the airplane 14, respectively. They may be located in pairs of windows located anywhere from the front to the back of the aircraft to obtain a voltage proportional to the vertical electric field from a voltage vector sum of the two. They may be located in any window forward of the leading edge of the wings or behind the rearward extent of the wings to obtain a useful vector difference voltage that is proportional to the horizontal electric field strength.

FIG. 2 illustrates one of a pair of wire mesh antennas 16 according to the present invention mounted in an aircraft window 18. Each of the two conducting antennas is connected to the high impedance input of a battery powered pre-amplifier 20*a* that provides a low (10 ohms to 100 ohms or more) impedance output so that the voltages can be connected by coaxial cable 22*a* to the combiner located with other instrumentation without significant attenuation of the signal due to cable losses.

FIG. 3 illustrates the electrical block diagram showing connection of the system components. Antenna element 16 is connected to pre-amplifier 20*a* and antenna element 17 is connected to pre-amplifier 20*b* and both pre-amplifiers 20*a* and 20*b* are connected to combiner 24 by respective coaxial cables 22*a* and 22*b*. A broadband amplifier 26 is connected at the output of the combiner 24. A frequency selective voltmeter 28 and recording instrument 30 such as a strip chart recorder may be connected to the amplifier 26 as illustrated for monitoring, measuring and recording the voltages due to the vertical and horizontal electric fields.

The combiner 24 may be implemented as illustrated in FIG. 4. As seen therein the pre-amplifiers 20*a* and 20*b* are connected to the primary windings 32*a* and 34*a* of transformers 32 and 34, respectively. The transformer output windings 32*b* and 34*b* are connected in parallel through switch 36 across output terminals 38 and 40. Switch 36 is provided with four stationary contacts 36*a*, 36*b*, 36*c* and 36*d* and ganged movable contacts 37*a* and 37*b*. With the movable contacts 37 in contact with stationary contacts 36*a* and 36*c* as illustrated in the drawing, the voltage across transformer output winding 32*b* would be added to that across transformer output winding 34*b* to provide a sum voltage at terminals 38 and 40. When the selectively movable contacts 37*a* and 37*b* are moved to the contacts 36*b* and 36*d*, the voltage across winding 32*b* would be subtracted from that across winding 34*b* to provide a difference voltage at terminals 38 and 40. These sum and difference voltages are proportional respectively to the electric vertical and horizontal fields as is described below.

Each of the window antennas together with the aircraft structure which is used as ground may be thought of as an asymmetrical dipole with some arbitrary orientation relative to the aircraft which may be considered as level. The voltage $E_L$ between the left antenna and the fuselage, ground, is $$\vec{E}_L = \vec{E}_V + \vec{E}_H$$

where $E_V$ and $E_H$ are voltages due to the vertical electric field and horizontal electric fields respectively. Because of the side to side symmetry of the aircraft structure and the two antennas about the plan view center line, the voltage $E_R$ available from the right antenna will be $$\vec{E}_R = \vec{E}_V - \vec{E}_H$$

The sum voltage is $\vec{E}_L + \vec{E}_R = 2\ \vec{E}_V$ and the difference voltage is $\vec{E}_L - \vec{E}_R = 2\ \vec{E}_H$ thus providing voltages proportional to the vertical and horizontal fields when the aircraft is level.

In addition to the illustrated embodiment, combining of the voltages to obtain the sum and difference voltages may be accomplished by any other suitable means such as, for example, operational amplifiers. Likewise, various other modifications and variations of the present invention are possible in the light of the above teachings. It is therefore to be understood that within the scope of the appended claims the invention may be practiced otherwise than as specifically described.

What is claimed is:

1. An antenna receiving system for detecting VLF/LF electric field variation aboard in flight aircraft comprising:

first and second antenna means each being adapted for quick and easy mounting on the surface of an aircraft window;

signal combiner means connected to said first and second antenna means for selectively providing the sum and the difference of the signal outputs from said first and second antenna means, said first and second antenna means being symmetrically oriented such that said sum and said difference of the signal outputs are proportional, respectively, to the vertical and horizontal electric fields associated with the signals received by said first and second antenna means.

2. The system of claim 1 wherein said first and second antenna means each comprise a wire mesh antenna.

3. The system of claim 1 wherein said signal combiner means comprises:

first and second transformers each having an output winding;

switch means connected to said first and second transformer output windings and being actuable between first and second positions;

whereby the voltage from said first transformer output winding is added to the voltage from said second transformer output winding when said switch means is in said first position and the voltage from said first transformer output winding is subtracted from the voltage from said second transformer winding when said switch is in said second position.

4. The system of claim 3 further including means connected to said signal combiner means for measuring and recording the voltage output of said signal combiner means.

* * * * *